(12) United States Patent
Sato

(10) Patent No.: US 11,750,789 B2
(45) Date of Patent: *Sep. 5, 2023

(54) IMAGE DISPLAY SYSTEM

(71) Applicant: VIRTUALWINDOW CO., LTD., Tokyo (JP)

(72) Inventor: Rui Sato, Tokyo (JP)

(73) Assignee: VIRTUALWINDOW CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/854,405

(22) Filed: Jun. 30, 2022

(65) Prior Publication Data

US 2022/0337801 A1    Oct. 20, 2022

Related U.S. Application Data

(63) Continuation of application No. 16/975,605, filed as application No. PCT/JP2018/009092 on Mar. 8, 2018, now Pat. No. 11,425,350.

(51) Int. Cl.
*H04N 13/117* (2018.01)
*H04N 13/383* (2018.01)
(Continued)

(52) U.S. Cl.
CPC ........... *H04N 13/117* (2018.05); *G06F 3/017* (2013.01); *G06F 3/16* (2013.01); *H04N 13/302* (2018.05); *H04N 13/383* (2018.05)

(58) Field of Classification Search
CPC .. H04N 13/117; H04N 13/383; H04N 13/302; H04N 13/111; G06F 3/017; G06F 3/16
See application file for complete search history.

(56) References Cited

U.S. PATENT DOCUMENTS

| 2011/0285704 A1* | 11/2011 | Takeda | G06T 15/00 345/419 |
| 2013/0113701 A1* | 5/2013 | Sasaki | G06T 19/00 345/156 |
| 2016/0180595 A1* | 6/2016 | Grassinger | G06F 3/011 345/419 |

FOREIGN PATENT DOCUMENTS

| JP | H08-167048 A | 6/1996 |
| JP | 2000-276613 A | 10/2000 |

(Continued)

OTHER PUBLICATIONS

May 15, 2018 Search Report issued in International Patent Application No. PCT/JP2018/009092.

(Continued)

Primary Examiner — Rowina J Cattungal
(74) Attorney, Agent, or Firm — Oliff PLC

(57) ABSTRACT

A storage part retains: screen positioning data indicating a position, orientation, and shape of the screen in a reference coordinate space; image capture part positioning data indicating the position and orientation of the user space image capture parts in the reference coordinate space; and three-dimensional data representing a three-dimensional object in the reference coordinate space. A processing part: identifies a user viewpoint position on the basis of the image capture part positioning data and the user space images; generates, on the basis of the user viewpoint position, the screen positioning data, and the three-dimensional data, a display image of the three-dimensional object being viewable as though the three dimensional object had been seen in a virtual space from the user viewpoint position via the screen; and causes said display image to be displayed on the screen of a display.

12 Claims, 9 Drawing Sheets

(51) Int. Cl.
H04N 13/302 (2018.01)
G06F 3/01 (2006.01)
G06F 3/16 (2006.01)

(56) References Cited

FOREIGN PATENT DOCUMENTS

| | | | |
|---|---|---|---|
| JP | 2011151676 A | * | 8/2011 |
| JP | 2011151676 A | | 8/2011 |
| JP | 2011248655 A | * | 12/2011 |
| JP | 2011248655 A | | 12/2011 |
| JP | 2013-254338 A | | 12/2013 |
| JP | 2014-86775 A | | 5/2014 |
| JP | 2015-008394 A | | 1/2015 |
| JP | 2015-059999 A | | 3/2015 |

OTHER PUBLICATIONS

Sep. 8, 2020 International Preliminary Report on Patentability issued in PCT/JP2018/009092.
Nov. 10, 2021 Non-Final Office Action Issued in U.S. Appl. No. 16/975,605.
Jun. 27, 2023 Office Action issued in Japanese Patent Application No. 2022-078412.

* cited by examiner

IMAGE DISPLAY SYSTEM

This is a Continuation of application Ser. No. 16/975,605 filed on Aug. 25, 2020, which is a PCT National Phase application of PCT/JP2018/009092 filed on Mar. 8, 2018. The disclosure of the prior applications is hereby incorporated by reference herein in its entirety.

TECHNICAL FIELD

The present invention relates to a technique for displaying, on a display, an image of a three-dimensional object viewable as though seen in a virtual three-dimensional space from a user position.

BACKGROUND ART

PTL 1 discloses a technique for displaying, on a flat panel display, an image having a shape which allows a virtual object to be visible from a human eye position. The three-dimensional image display device in PTL 1 includes a display which displays an image, a position measuring device which measures the position of the eyes of a person who look at the display, and processing means for obtaining, through calculation, a three-dimensional image having a shape such that as though the image is viewed from the direction of the position of the eyes of the person by using information indicating the position of the eyes of the person provided by the position measuring device, and displaying the three-dimensional image on the display.

CITATION LIST

Patent Literature

[PTL 1]
Japanese Patent Application Publication No. H08-167048

SUMMARY OF INVENTION

Technical Problem

If an image of a three-dimensional object in a virtual space, which does not actually exist, is projected in a pseudo manner and displayed on a display such that, when viewed from the user's viewpoint, the image appears as though the object exists at the position, it is possible to give the user an illusion of looking at the three-dimensional object on the backside of the display in the virtual space through a pseudo window of the display. This technique implementable in a virtual reality experience device or an augmented reality experience device using a display can provide a user with various experiences. For example, the display can be freely set up on a windowless wall, for instance, at a hotel, a residence, or an office, to improve an indoor scene thereof and serve as a pseudo-window.

For virtual and augmented reality experiences, it is important that an image displayed on a display looks natural and close to an actual field of view. In applications to interiors at hotels, residences, or offices, if an image displayed on a pseudo-window looks unnatural, then the degree of illusion to be given to a user is lowered, whereby interior scene improvement may not be realized. For example, when the position of the user's viewpoint cannot be correctly detected or an image visible from the position of the user's viewpoint cannot be correctly generated, a projected image conforming to the user's viewpoint cannot be displayed, and the image displayed on the display ends up looking unnatural to the user.

However, in PTL 1, identifying with high accuracy relative positions and orientations of the display and the user is not taken into account. As a result, the position and orientation of the display relative to the user cannot be correctly identified, hence an image visible from the user's position may not be correctly displayed on the display.

It is an object of the present invention to provide a technique for identifying the position and orientation of a user relative to a display with high accuracy and displaying on the display an image in a virtual space viewable from the position.

Solution to Problem

A image display system according to one aspect of the invention includes a display having a screen capable of displaying an image, a user space image capture part configured to obtain a user space image by image-capturing a user space that is further forward than the screen and where a user viewing the image displayed on the screen of the display is likely to exist, a storage part configured to hold screen positioning data indicating a position, orientation, and shape of the screen in a prescribed reference coordinate space, image capture part positioning data indicating a position and orientation of the user space image capture part in the reference coordinate space, and three-dimensional data representing a three-dimensional object on the reference coordinate space, and a processing part configured to identify a user viewpoint position on the reference coordinate space on the basis of the image capture part positioning data and the user space image obtained by the user space image capture part, and generate, on the basis of the user viewpoint position, the screen positioning data, and the three-dimensional data, a display image of the three-dimensional object that is viewable as though the three-dimensional object is seen in a virtual space from the user viewpoint position via the screen, and cause the display image to be displayed on the screen of the display.

Advantageous Effects of Invention

According to the present invention, the screen positioning data of the display, the image capture part positioning data of the user space image capture part, and the virtual space three-dimensional data are set in the same reference coordinate space to implement calculation, hence, the position of a user with respect to the display can be identified with high accuracy, and an image of a highly probable virtual space, which is visible from the position, can be displayed on the display.

DESCRIPTION OF EMBODIMENTS

Hereinafter, embodiments of the present invention will be described with reference to the drawings.

First Embodiment

Figure 1:
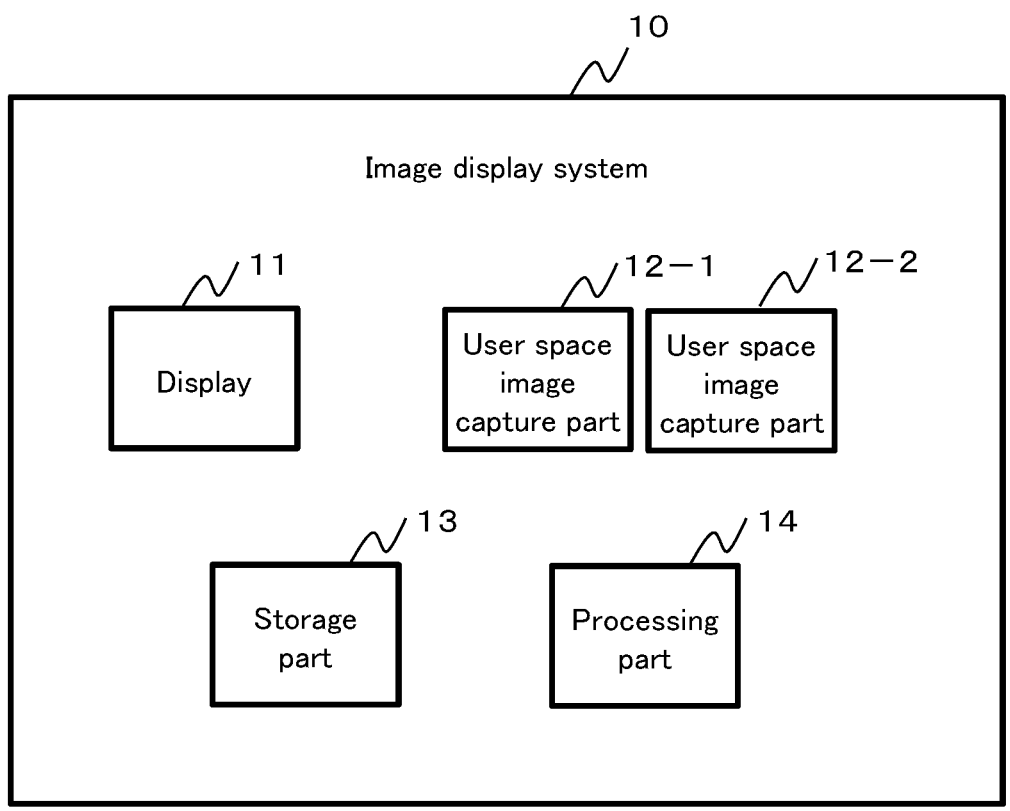
FIG. 1 is a block diagram of an image display system according to a first embodiment of the present invention.
Figure 2:
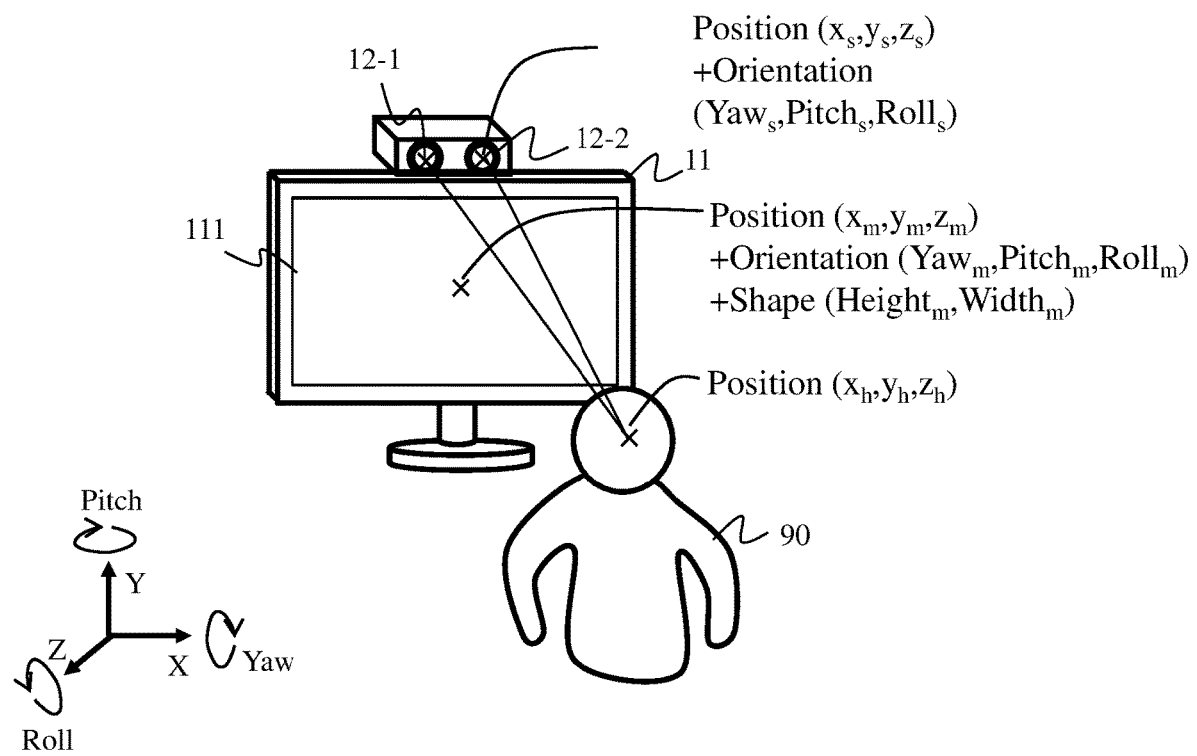
FIG. 2 is a schematic overview of the image display system according to the first embodiment.

FIG. 1 is a block diagram of an image display system according to a first embodiment of the present invention. FIG. 2 is a schematic overview of the image display system according to the first embodiment.

With reference to FIG. 1, the image display system 10 includes a display 11, two user space image capture parts 12-1 and 12-2, a storage part 13, and processing part 14. The user space image capture parts 12-1 and 12-2 are identical. In the following description, one or both of the user space image capture parts 12-1 and 12-2 will be simply referred to as a user space image capture part 12 in some cases.

The display 11 is an output display device having a screen 111 capable of displaying an image. The display type may be, but not limited to, a liquid display, a plasma display, an organic EL display, or an FED (Field Emission Display). Alternatively, the display 11 may be a display device which projects an image on the screen. In this case, the screen corresponds to the screen 111.

The user space image capture part 12 images a user space further forward than the screen 111 and where a user 90 viewing the image displayed on the screen 111 of the display 11 is likely to exist and obtains a user space image.

It is expected that the screen display system 10 may be used, but not limited to, in order to provide interior scene improvement using the surface screen 111 of the display 11 as a pseudo window, as a device for allowing the user to experience virtual realities and augmented realities in amusement facilities such as amusement centers and theme parks or a device installed at home, or as an object displayed indoors and outdoors to attract attention as an artistic item or an advertisement. The display 11 according to the image display system 10 can be used as a display device in the field of virtual reality and augmented reality technology to allow a user to have a virtual and augmented reality experience that feels real similarly to the case of wearing an HMD (Head Mount Display) without the inconvenience of wearing the device on a user's head.

The location of the image display system 10 is not particularly limited, but when used for example in hotel rooms, offices, and houses, each of hotel guests, office workers working in the office, and house residents is a user 90, and each room in which the display 11 is located is a user space. When for example used in entertainment facilities, each of the persons experiencing entertainment is the user 90, the space for use and the area where the person can move is the user space (which includes situations in various positions, such as being seated and lying on his/her back or his/her face).

The storage part 13 is a volatile memory and/or a non-volatile memory. The storage part 13 stores screen positioning data indicating the position, orientation, and shape of the screen 111 in a prescribed reference space, image capture part positioning data indicating the position and orientation of the user space image capture parts 12-1 and 12-2 in the reference coordinate space, and three-dimensional data representing a virtual three-dimensional object on the reference coordinate space. The reference coordinate space is a space represented on the basis of a coordinate system (reference coordinate system) having a prescribed origin O as a reference for operation according to the present embodiment.

The reference coordinate space and its origin O may be set in any way. For example, the reference coordinate space may be fixed with respect to the screen 111 or the user space image capture part 12 or may be fixed to both the screen 111 and the user space image capture part 12 or may not fixed to either.

In the example in FIG. 2, the reference coordinate space is the space using the orthogonal coordinate system having the three axes, x, y, and z. The position $(x_s, y_s, z_s)$ and orientation $(Yaw_s, Pitch_s, Roll_s)$ of the user space image capture part 12 and the position $(x_m, y_m, z_m)$, the orientation $(Yaw_m, Pitch_m, Roll_m)$, and the shape $(Height_m, Width_m)$ of the screen 111 are set on the reference coordinate space. Here, the screen 111 is rectangular by way of illustration, and its shape is expressed by the height and width.

According to the embodiment, the central position $(x_h, y_h, z_h)$ of the head of the user 90 on the reference space is used as the user viewpoint position. The user's viewpoint needs only be a position of the user 90's viewpoint or a point that can be regarded as a user 90's viewpoint. The viewpoint position is not limited to the examples according to the embodiment. As another example, the midpoint between the eyes of the user 90 may be set as the user viewpoint position. The center of the area of the face recognized by face recognition processing or person recognition processing or the recognized midpoint between the eyes may be used as the user viewpoint position.

According to the embodiment, as an example, the lens center of the user space image capture part 12 is defined as the position $(x_s, y_s, z_s)$ of the user space image capture part 12. Here, as an example, the center of the screen 111 is set to the position $(x_m, y_m, z_m)$ of the screen 111.

The processing part 14 is a device for executing prescribed processing using the data recorded in the storage part 13, and is, for example, a processor executing processing according to a software program. The processing part 14 identifies the user viewpoint position on the reference coordinate space on the basis of the image capture part positioning data and images obtained by the two user space image capture parts 12-1 and 12-2. The processing part 14 generates a display image of a three-dimensional object which is visible when the three-dimensional object on the virtual space is viewed from a user viewpoint position through the screen 111 on basis of the user viewpoint position, the screen positioning data, and the three-dimensional data, and has the display image displayed on the display 11. In this way, the display image at the display 11 can be seen from the user 90 as if the three-dimensional object exists on the virtual space.

When determining the user viewpoint position, the processing part 14 may, for example, identify a person (user 90) from each of the user space images obtained at the same time in the two user space image capture parts 12-1 and 12-2, determine the position where the head of the user 90 is shown in the user space image, and calculate the distance from the user space image capture parts 12-1 and 12-2 to the head of the user 90 on the basis of the image capture part positioning data and the parallax of the head of the user 90 between the two user space images. The triangulation principle can be applied to determine the precise user viewpoint location in a simple manner.

However, the construction and method for determining the user's viewpoint position are not limited to the stereo sensor shown herein and may be in any other manner. As another example, the user space image capture part 12 may emit an infrared laser beam with a dot pattern having a large number of dots and calculate the distance from the user space image capture part 12 to the part of the image provided with the infrared laser irradiation on the basis of the image irradiated with the infrared laser beam. The infrared laser beam and/or the dot pattern has a prescribed diversion angle, and as the dot size and/or the dot pitch increases as the distance from the user space image capture part 12 increases at the part irradiated with the infrared laser beam. The distance from the user space image capture part 12 to the part irradiated with the infrared laser beam can be calculated from the dot size and/or the dot pitch.

As another example, the user space image capture part 12 may emit modulated infrared light, project infrared light reflected on and returned from the object at array sensors for each of the pixels, and calculate the distance from the user space image capture part 12 to the object which has reflected the infrared light on the basis of the phase difference between the infrared light directed on each of the pixels and the received infrared light. Alternatively, the depth of an object in an image may be calculated from an image captured by a monocular imaging device and the method may be applied to the user space image capture part 12. As yet another example, a physical marker having a prescribed shape and/or size which can be easily detected by a sensor or a light emitter marker which emits a prescribed kind of light such as light from an infrared LED may be attached to the user himself/herself or to an article held by or mounted to the user, so that user viewpoint is determined from the position of the marker, and the method may be applied to the user space image capture part 12.

The display 11 and the user space image capture part 12 according to the embodiment may be formed as separate devices having separate housings as illustrated in FIG. 2 or integrally formed as a device having a single housing.

The display 11 and the user space image capture part 12 configured as separate devices may each have processing part to take over the function of the processing part 14. In this case, the processing part for the display 11 and the processing part for the user space image capture part 12 communicates wirelessly or by wire.

Figure 3:
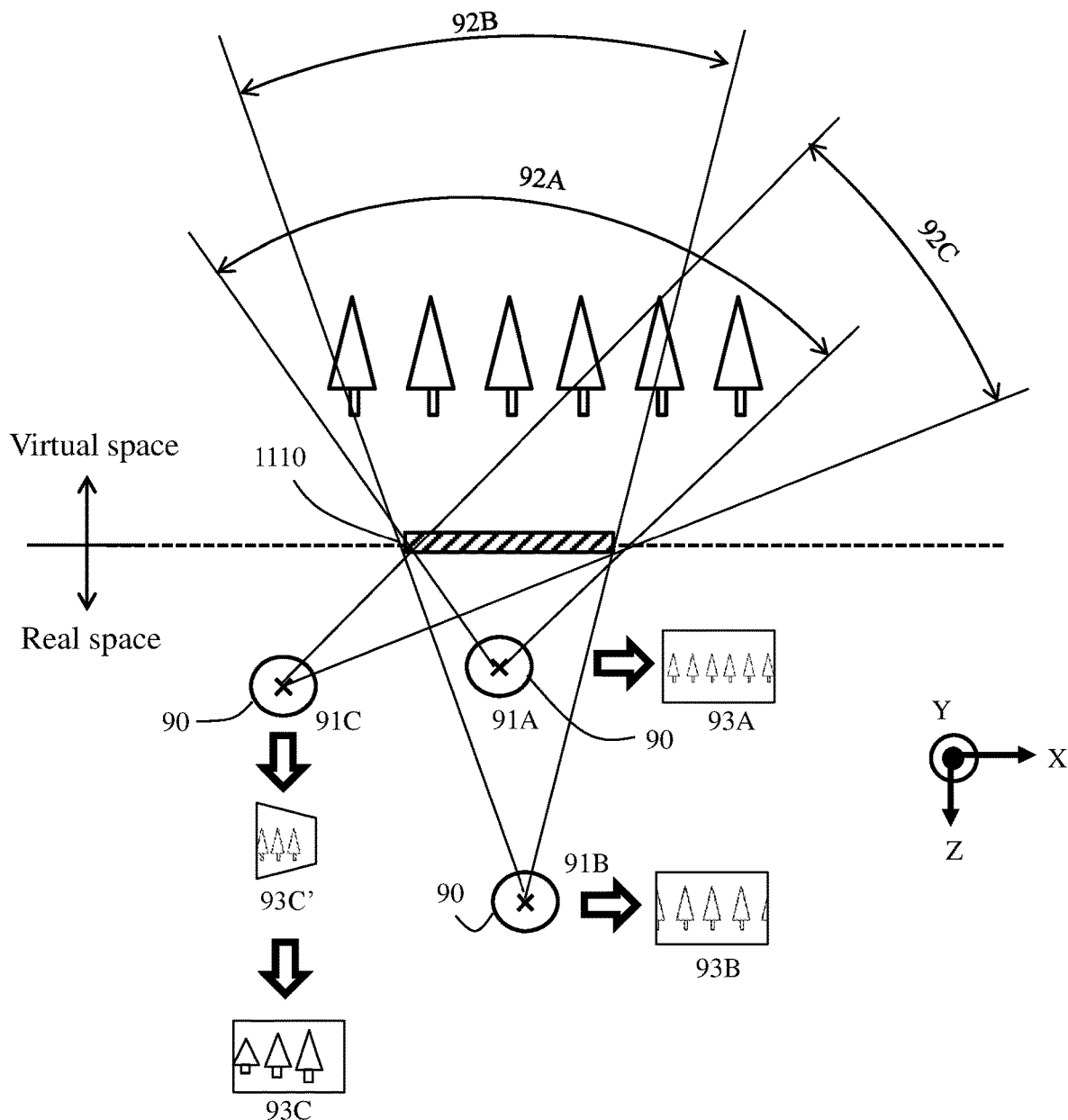
FIG. 3 is a view for illustrating how the image display system according to the first embodiment displays an image corresponding to a user viewpoint position.

FIG. 3 is a view for illustrating how the image display system according to the first embodiment displays an image corresponding to a user viewpoint position. The user space in front of the screen 111 of the display 11 is a real space. A virtual space defined on the backside of the screen 111 is displayed on the screen 111 as an image visible from a position 91 at the head of the user 90 through a window provided in a pseudo manner by the screen 111 (hereinafter also referred to as the "pseudo window"). Three-dimensional objects in the virtual space are defined by three-dimensional data. In the example in FIG. 3, six trees are arranged horizontally as the three-dimensional objects. Although the virtual space is defined on the backside of the screen 111 in FIG. 3 for the purpose of illustration, the virtual space may be defined in front of the screen 111, or the space including the front and rear parts of the screen 111 may be defined as a virtual space. Therefore, the screen 111 can display not only the image of a three-dimensional object in the virtual space appearing as if existing beyond the virtual window by the screen 111 but also an image of a three-dimensional object in the virtual space appearing as if protruding forward from the screen 111.

When the user 90 is at a position 91A near the front of the screen 111, a field of view 92A in the virtual space visible through the pseudo window of the screen 111 is wide and the image is displayed on the screen 111 as if all the six trees are in the field of view 92A (display 93A). When the user 90 moves from the position 91A in the z-direction and comes to a position 91B away from the screen 111, the field of view 92B in the virtual space visible through the pseudo window of the screen 111 is narrowed, and the image is displayed as if the entire three trees and only part of the trees on both sides of the three trees are in the field of view 92B (display 93B). When the user 90 moves from the position 91A in −x (minus x) direction and reaches the position 91C, the field of view 92C of the virtual space visible through the pseudo window of the screen 111 changes in the x-direction. The field of view 92C includes only three trees at the right end. In the field of view 92C, the screen 111 is viewed in an oblique direction rather than from the front, but the lateral thickness of the trees visible through the pseudo window needs to have the same thickness as that when viewed from the front (display 93C'). To this end, in order to display trees on the screen 111, the image having gone through expansion/contraction processing as appropriate so that the image looks like the display 93C' is displayed (display 93C). In this way, according to the present embodiment, when an image to be displayed on the screen 111 of the display 11 is generated through processing for making an image look probable and natural so as to give the user 90 the illusion that a three-dimensional object on a virtual space exists there, the three-dimensional object on the virtual space defined on the basis of the three-dimensional data is projected on the screen 111 of the display 11, in other words, on a two-dimensional surface (projective transformation). As another method, points in three-dimensional data may be projected on points at which straight lines connecting the points and the user viewpoint position cross the screen 111 in the coordinate reference space. As another processing method for generating an image to be displayed on the screen 111 of the display 11, four arithmetic processing to a particular matrix or numerical values according to an empirical rule may be performed on an image or the three-dimensional parameters of the image.

The angle of field of the user space image capture part 12 is preferably at least 110°. According to the embodiment, the angle of field of the user space image capture part 12 is set to 110° by way of illustration. Hereinafter, the reason why the angle of field of the user space image capture part 12 is preferably at least 110° will be described.

Figure 4:
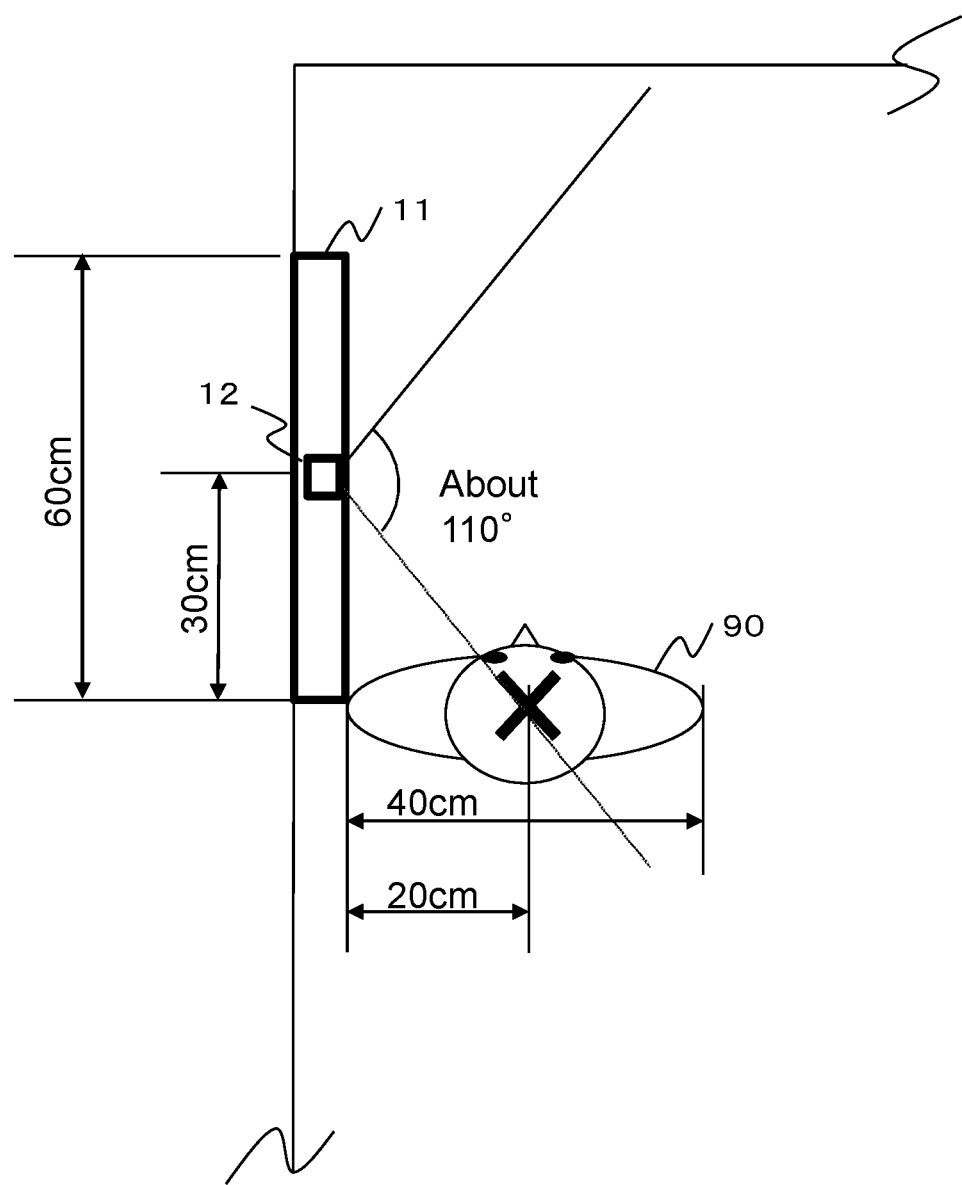
FIG. 4 is a view for illustrating the angle of view of a user space image capture part in the image display system according to the first embodiment.

FIG. 4 is a view for illustrating the angle of field of the user space image capture part in the image display system according to the first embodiment. FIG. 4 is a top view of the display 11 of the image display system 10 and the user 90 in a room. For ease of illustration, one user space image capture part 12 is illustrated in FIG. 4.

Here, it is assumed that the user 90 is working and studying in a private room with a pseudo window by the display 11 with a width of 60 cm. The user 90 is near a wall and faces in a direction parallel to the wall. The width of the display 11, 60 cm, is a suitable width for a desk for work and study and a width for common storage furniture used at home, and a suitable size as the width of the pseudo-window. When an application as a stationary virtual experience device is expected, displays may be arranged to surround the user, but the relative positional relation between the user and the display placed immediately adjacent to the user at this time is also considered to be as shown in FIG. 4. For example, in a situation where three displays are arranged side by side in a U shape on the front, right, and left sides of the user, it can be considered that the relative relation between the user and the right and left displays is as shown in FIG. 4.

If the head of the user 90 is situated in front of the display 11 (within the width of the display 11 in front of the display 11), the user 90 is clearly aware of the pseudo window by the display 11 even when facing parallel to the screen 111, so that the image on the display 11 is preferably a natural image in the virtual space visible from the position of the user 90.

Referring to FIG. 4, the body of the user 90 is situated in a position consistent with the end of the display 11, and the user 90 faces in a direction parallel to the display 11. Even in the state, it is necessary that the image display system 10 can detect the user viewpoint position of the user 90.

In order to allow the user viewpoint position to be detected when the shoulder width of a human body is 40 cm, the user space image capture part 12 is centered in the width direction of the display 11, and the position is moved backward as the user moves the sitting surface rearward, the user space image capture part 12 needs only have an angle of field of at least 110° as shown in FIG. 4.

As described above, according to the embodiment, the user space in front of the screen 111 is imaged at an angle of field of at least 110°, the user viewpoint position is calculated from the obtained user space image, the user viewpoint position can be recognized in a wide range of the user space and an image on a pseudo window visible from the user in a wide measurement range can be displayed.

According to the embodiment, when the angle of view is at least 110° and the width of the screen 111 of the display 11 is up to 60 cm, which goes well with the width of a desk or the width of storage furniture, the user viewpoint position can be detected within a range in which the head of the user 90 can be present, considering that a typical human shoulder width is about 40 cm. This allows a window up to about 60 cm wide to be simulated well on the display 11.

According to the embodiment, since the screen 111 and the user space image capture part 12 are arranged on the same reference coordinate space and the user viewpoint position and the display image on the reference coordinate space are calculated, a common design can easily be applied to a system in which the relative position or/and orientations of the user space image capture part 12 and the display 11 are different. For example, not only in a system in which the user space image capture part 12 and the display 11 are separate devices and their positions can be selected freely as desired but also in a system in which the user space image capture part 12 and the display 11 are integrally configured and have fixed positions and orientations, the relative position and orientations of the user space image capture part 12 and the display 11 are different among multiple different types of systems having different screen sizes and shapes. A common design can be applied to these different types of systems.

When multiple displays 11 are used in the same room, regardless of the positions and angles of the displays 11, the screens 111 of the multiple displays 11 may be placed on the same reference coordinate space and images to be displayed on the screens 111 may be calculated on the same reference coordinate space by a common calculating method. Images on the multiple displays 11 in the same room can be continuous with high accuracy. This can provide a high visual effect in improving indoor scenes for example in hotels, houses, and offices.

According to the embodiment, the angle of field of the user space image capture part 12 is at least 110°, the width of the screen 111 is at most 60 cm, and the imaging direction of the user space image capture part 12 is arranged perpendicularly to the screen 111. However, if the angle of field of the user space image capture part 12 is at least 110°, the system having other conditions can also detect the user's viewing position well. For example, when the angle of field is at least 110°, the screen can have an effective width of about 100 cm. Considering the relative position of the user space image capture part 12 to the display 11 and the location where the display 11 and the user space image capture part 12 are supposed to be installed, the imaging direction of the user space image capture part 12 may be set in a direction appropriately shifted vertically or horizontally from the direction perpendicular to the screen 111, so that better results can be obtained. More specifically, the user viewpoint position can be detected in a wider range in the user space.

According to the embodiment, the processing part 14 detects a prescribed gesture made by the user 90 from time series user space imaged and performs prescribed processing corresponding to the gesture. Since the user space image capture part 12 obtains a user space image with a wide angle of field and the processing part 14 detects the prescribed gesture from the user space image and executes prescribed processing corresponding to the gesture, desired operation can be performed by the user 90 situated in a practical range without a remote controller for operation.

Hereinafter, the operation of the image display system 10 will be described in detail.

Figure 5:
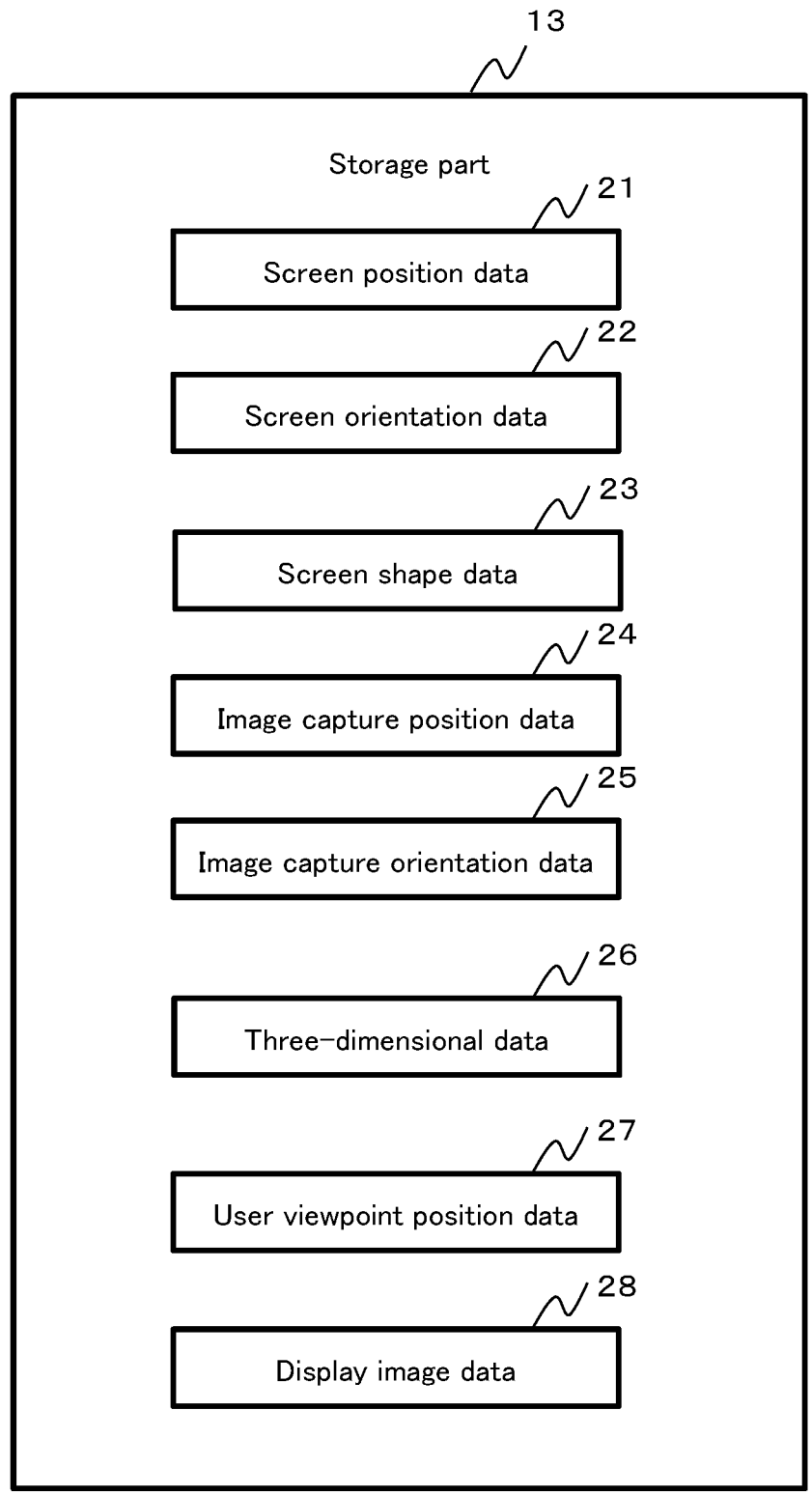
FIG. 5 is a chart for illustrating data recorded in a storage part according to the first embodiment.

FIG. 5 is a chart for illustrating data recorded in the storage part in the first embodiment. Referring to FIG. 5, the storage part 13 records screen position data 21, screen orientation data 22, screen shape data 23, image capture position data 24, image capture orientation data 25, three-dimensional data 26, user viewpoint position data 27, and display image data 28. The screen positioning data described above includes the screen position data 21, the screen orientation data 22, and the screen shape data 23. The above-described image capture part positioning data includes the image capture position data 24 and the image capture orientation data 25 described in the above.

The screen position data 21 represents the position ($x_m$, $y_m$, $z_m$) of the screen 111. The position ($x_m$, $y_m$, $z_m$) of the screen 111 may be established and set at the time of installation of the display 11 or may be such that the value of the position information which is freely moved after the display 11 is installed and recorded in the storage part 13 is constantly updated as a result of movement. When multiple displays 11 are used, their respective positions ($x_m$, $y_m$, $z_m$) are set.

The screen orientation data 22 represents the orientation ($Yaw_m$, $Pitch_m$, $Roll_m$) of the screen 111. The orientation ($Yaw_m$, $Pitch_m$, $Roll_m$) of the screen 111 may be established and set at the time of installation of the display 11 or may be set as a fixed value at the time of design or shipment along with the condition for installing the display 11. For example, the installation condition may be such that the display 11 is fixed horizontally to a wall surface, and the orientation ($Yaw_m$, $Pitch_m$ $Roll_m$) when installed according to the installation condition may be preset. The display 11 may rotate freely after installation and the value in orientation information recorded in the storage part 13 may be continuously updated in response to the rotation. When multiple displays 11 are used, the orientation ($Yaw_m$, $Pitch_m$, $Roll_m$) is set for each of the displays.

The screen shape data 23 represents the shape ($Height_m$, $Width_m$) of the screen 111. As the shape ($Height_m$, $Width_m$) of the screen 111, fixed values may be set for the display 11 at the time of design or shipment, or the display 11 may deform freely after installation and the shape may be updated as the numerical values in the shape information recorded in the storage part 13 may be constantly updated in response to the deformation. When multiple displays 11 are used, the shape ($Height_m$, $Width_m$) is set for each of the displays. Note that since it is assumed that the shape of the screen 111 is a rectangle, and $Height_m$ is a length in the height-wise direction and $Width_m$ is a width in the width-wise direction, while the shape of the screen 111 is not limited to a rectangle. For example, the shape of the screen 111 may be an isosceles triangle and may be represented by the length of the base and its height. Alternatively, the shape of the screen 111 may be a trapezoidal shape and represented by the bases and the height. Alternatively, a curved surface screen can be used as the screen 111. When the rectangular plane is curved with a particular curvature, the shape can be represented by the height and width of the rectangle and the curvature or radius of the rectangle. Similarly, the screens in various shapes such as a sphere, a long sphere, a flat sphere, and a rotating body, may be represented with parameters that characterize the shapes. Any screen including those illustrated here can define its shape on the reference coordinate space and calculate the image to be displayed.

The image capture position data 24 represents the positions ($x_s$, $y_s$, $z_s$) of the user space image capture parts 12-1 and 12-2 described above. The position ($x_s$, $y_s$, $z_s$) of the image capture position data 23 is determined and set when the user space image capture part 12 is installed.

The image capture orientation data 25 represents the orientations ($Yaw_s$, $Pitch_s$, $Roll_s$) of the user space image capture parts 12-1 and 12-2 described above. The orientations represented by the image capture orientation data 24 ($Yaw_s$, $Pitch_s$, $Roll_s$) may be determined and set when the user space image capture part 12 is installed, or may be set as a fixed value in advance along with the installation condition for the user space image capture part 12.

The three-dimensional data 26 is based to form an image to be displayed on the display 11 and represents a three-dimensional object existing in the virtual space illustrated in FIG. 3. Here, the three-dimensional data may be data representing a three-dimensional object in a three-dimensional space, and a specific method therefor is not particularly limited. The data may be data having three-dimensional information produced by computer graphics or data having real still images or moving images pasted on a three-dimensional object on a plane without thickness. The data may be obtained by attaching still images or the moving images captured with a camera or the like using a wide-field lens with a field of view of 180° or close to 180°, or with a 360° camera to the surface of a spherical surface with no thickness.

The user viewpoint position data 27 represents the user viewpoint position described above. Since the user viewpoint position is repeatedly updated by the processing part 14, the user viewpoint position data 27 is also updated each time. For example, when the frame rate of the display 11 is 30 fps and the user viewpoint position is updated in the same period, the user viewpoint position data 27 is updated 30 times per second. The user viewpoint position data 27 includes time-series data on the user viewpoint position.

The display image data 28 is data on an image obtained by projecting three-dimensional data in a space beyond the pseudo-window by the screen 111 from the user viewpoint position as described above to make it look as if a three-dimensional object exists in the space beyond the and is the data of an image displayed on the screen 111. When there is more than one display 11, the data displayed on the screen 111 of each display 11 is recorded as the display image data 27. Since the data of the image displayed on screen 111 is repeatedly updated by the processing part 14, the display image data 28 is also updated each time. For example, if the frame rate of display 11 is 30 fps, display image data 28 will be updated 30 times per second.

Figure 6:
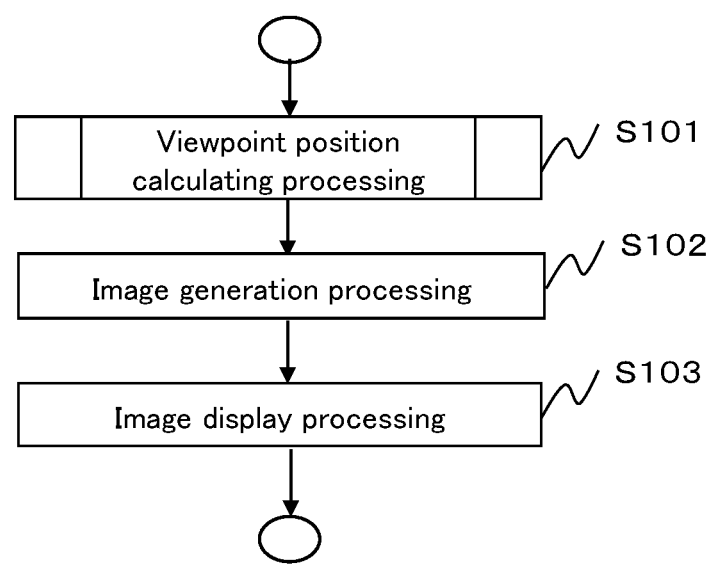
FIG. 6 is a flowchart for illustrating overall processing by the image display system according to the first embodiment.

FIG. 6 is a flowchart for illustrating the overall processing by the image display system according to the first embodiment. Various kinds of processing for FIG. 6 are performed by the processing part 14. The processing part 14 periodically repeats the processing in FIG. 6 so that the image displayed on the display 11 changes over time and is recognized as a moving picture by the user 90. For example, when the frame rate of an image displayed on the display 11 is 30 fps, the processing part 14 repeats the processing shown in FIG. 6 30 times per second.

Referring to FIG. 6, the processing part 14 first performs viewpoint position calculation processing (step S101). The viewpoint position calculation processing computes the aforementioned user viewpoint position and records it as the user viewpoint position data 26 in the storage part 13. Details of the viewpoint position calculation processing will be described later with reference to FIG. 7.

Next, the processing part 14 performs the image generation processing (step S102). The image generation processing generates an image of a three-dimensional object that is visible through the screen 111 from the user viewpoint position indicated by the user viewpoint position data 26 recorded in the storage part 13, and records the data in the storage part 13. When multiple displays 11 are provided, the processing part 14 generates an image displayed on the screen 111 of each display 11 and records the data in the display image data 27.

Next, the processing part 14 performs the image display processing (step S103). The image display processing is processing in which an image of a three-dimensional object visible through the screen 111 is displayed on the display 11 based on the display image data 27 recorded in the storage part 13. When there is more than one display 11, the processing part 14 causes the data of the image of the three-dimensional object visible through the screen 111 of each display 11 to be displayed on each display 11.

For example, as shown in FIG. 2, when the display 11 and the stereo sensor having the user space image capture parts 12-1 and 12-2 are provided as separate devices, step S101 may be performed by the processing part of the stereo sensor, and the steps S102 and S103 may be performed by the processing part of the device constituting the display 11.

The processing part 14 according to the embodiment may generate a display image of a three-dimensional object which is visible from a user viewpoint position through the screen 111 by applying projection transformation to the three-dimensional data 25. The projection transformation causes the three-dimensional object based on the three-dimensional data 25 to be projected mathematically relative to the screen, taking into account the user viewpoint position, so that when the user 90 views the screen 111 in an oblique direction, the three-dimensional object is displayed as a probable and natural image.

The processing part 14 may perform processing for removing noise included in the user viewpoint position on the basis of time-series user space images obtained up to the present by the user space image capture part 12 or/and a user viewpoint position. When the most recently captured user space image is directly subjected to image processing, the result is used to calculate the user viewpoint position, and an image of a three-dimensional object visible from the user viewpoint position is generated, the user viewpoint position may be suddenly calculated as a greatly shifted position due to various noise elements generated only at that time, which may give rise to fluctuations in displayed images on a frame-by-frame basis. According to the embodiment, noise at the user viewpoint position is removed on the basis of the past user space images or the user viewpoint position, and then the current user viewpoint position is determined, so that fluctuations in the displayed images can be reduced. As a method for removing noise, noise determination is performed on the basis of user space image data in the past, and noise in the current space image is removed on the basis of the determination result. According to another method, the current user viewpoint position may be updated (or modified) using a Kalman filter on the basis of data from data on the past user viewpoint positions and data on the current user viewpoint position.

Figure 7:
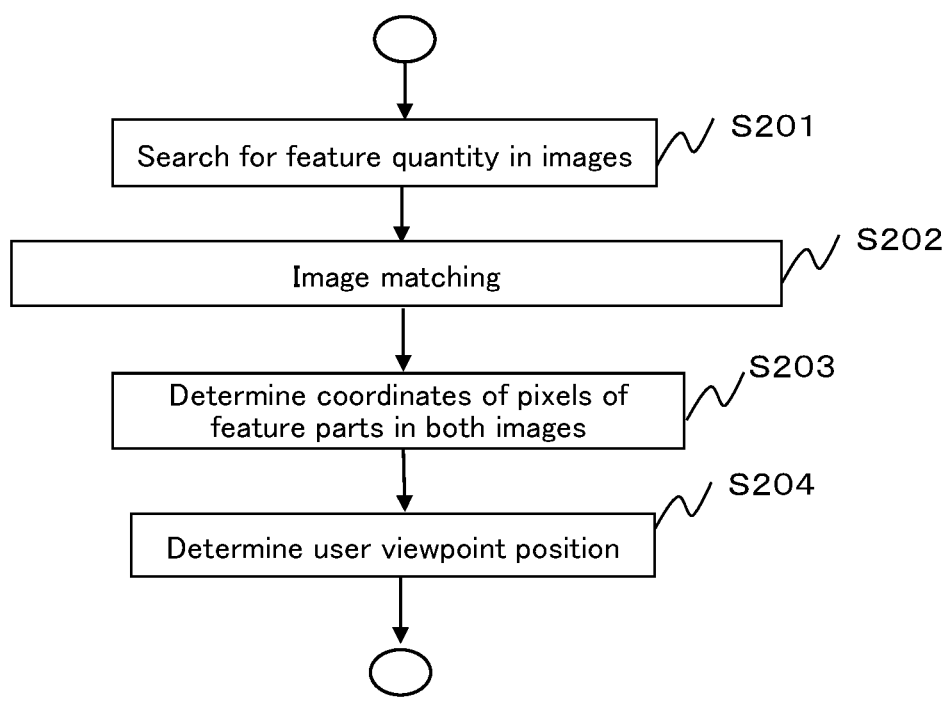
FIG. 7 is a flowchart for illustrating viewpoint position calculating processing by the image display system according to the first embodiment.

FIG. 7 is a flowchart for illustrating viewpoint position calculation processing using an image display system according to the first embodiment.

Referring to FIG. 7, the processing part 14 first makes a feature quantity search in an image (step S201). The feature quantity search is made to detect the head of a person (user 90) from one of images captured by the user space image capture parts 12-1 and 12-2. The processing for detecting the human head from an image can be achieved, for example, by using a facial recognition technique. In this case, a method for recognizing a facial pattern based on brightness difference according to a Haar-like feature may be used. A learning device (trained artificial intelligence program) trained by deep learning or machine learning to directly recognize the user from an image may be used to recognize the position of the face or a head center position directly from the somatic skeleton.

Then, the processing part 14 performs image matching processing (step S202). The image matching processing is performed to compare images from the user space image capture parts 12-1 and 12-2 and determine a location in one of the images having a part identical to a feature part in the other image which has been searched for and recognized as a part of the user 90 in step S201.

Then, the processing part 14 identifies the pixel coordinates of the feature parts in both images (step 203). In this case, the processing part 14 obtains the pixel coordinates in the feature parts in the images captured by the user space image capture parts 12-1 and 12-2.

Then, the processing part 14 associates the pixels with the three-dimensional coordinates on the basis of the result of the image matching processing (step S204). When the pixel coordinates of the parts in the two images which show the same object are determined by the processing in step S203, the three-dimensional coordinates of the locations can be determined using the principles of triangulation.

When the determined locations are at the head of the user 90, the three-dimensional coordinates are to be determined as the user viewpoint position. At the time, the processing part 14 may determine, for example, the position of the center of the head as a head position $(x_h, y_h, z_h)$. In this case, the radius of the head is estimated from the image, and the three-dimensional coordinates of the position shifted in the depth-wise direction from the surface of the center of the head by the distance equal to the radius represent the head position. Specifically, the value corresponding to the radius may be added to the z-value in the three-dimensional coordinates of the surface at the center of the head.

As another example, the processing part 14 may set the position of the surface of the center of the head in the image as the head position $(x_h, y_h, z_h)$. In this case, the three-dimensional coordinates corresponding to the pixel which displays the center of the head directly correspond the head position.

As another exemplary method for determining a user viewpoint position, the processing part 14 may detect a region a region having a person-like feature in an image, obtain the distances from the user space image capture parts 12-1 and 12-2 to the feature region, and then simply estimate the user viewpoint position on the basis of the distances to the pixel coordinates $(x_v, y_v)$ and the feature region, while the center position in the horizontal direction of the feature region is $x_v$, and the position about 10 cm below the top of the feature region in the vertical direction is $y_v$. According to the method, the viewpoint position is assumed to be 10 cm below the parietal region.

It should be noted that the head of the user 90 is not necessarily shown in both the user space images of the two user space image capture parts 12-1 and 12-2. For example, the positional difference between the user space image capture parts 12-1 and 12-2 and the influence of obstacles may cause only one of the user space images from the two user space image capture parts 12-1 and 12-2 to have the head of the user 90. If this is the case, the user viewpoint position may be estimated. In this way, a user viewpoint position can be determined in a wide range and used to generate an image.

For example, the processing part 14 may record at least one of the data on the images obtained by the user space image capture parts 12-1 and 12-2 and information about a user viewpoint position calculated from the images, calculate the user viewpoint position on the basis of the parallax among the plurality of images when a prescribed user part (the head in this example) related to the user viewpoint position is shown in the images by the plurality of user space image capture part 12, and estimate the user viewpoint position on the basis of the data on the image and data on images in the past or the user viewpoint positions in the past when the user part is shown only in the image by one user space image capture part 12.

According to the embodiment, the processing part 14 may not be able to detect a feature quantity due to the violent movement of the user 90 or the influence of the brightness of the room, and temporarily may not be able to calculate the user viewpoint position of the user 90 from the images captured by the user space image capture parts 12-1 and 12-2. In this case, the processing part 14 may estimate the current user viewpoint position on the basis of the past time-series user viewpoint positions stored in the storage part 13 as user viewpoint position data 27. Specifically, data on a three-dimensional vector indicating the moving speed and moving acceleration of the user 90 and their directions may be recorded from the history of the user viewpoint positions in the past, and the current user viewpoint position may be estimated from these kinds of data. For example, when there is no obstacle ahead in the moving direction, the speed may change from the latest calculated moving speed with the latest calculated moving acceleration, and the position moved from the latest calculated user viewpoint position to the present can be regarded as the current user viewpoint position.

According to the embodiment, the processing part 14 may correct the user viewpoint position and generate an image of a three-dimensional object visible through the screen 111 from the corrected user viewpoint position. The accuracy of the user viewpoint position can be improved. For example, a plurality of stereo sensors having user space image capture parts 12-1 and 12-2 may be provided to estimate the user viewpoint position according to a least squares method from a plurality of user viewpoint positions obtained by those stereo sensors. The user viewpoint position may also be estimated according to a least squares method from at least two user viewpoint positions obtained by any combination of at least two arbitrary devices for example from a stereo sensor having two user space image capture parts 12-1 and 12-2, an infrared sensor illustrated as another sensor, and a sensor for measuring a user's position using a marker.

Figure 8:
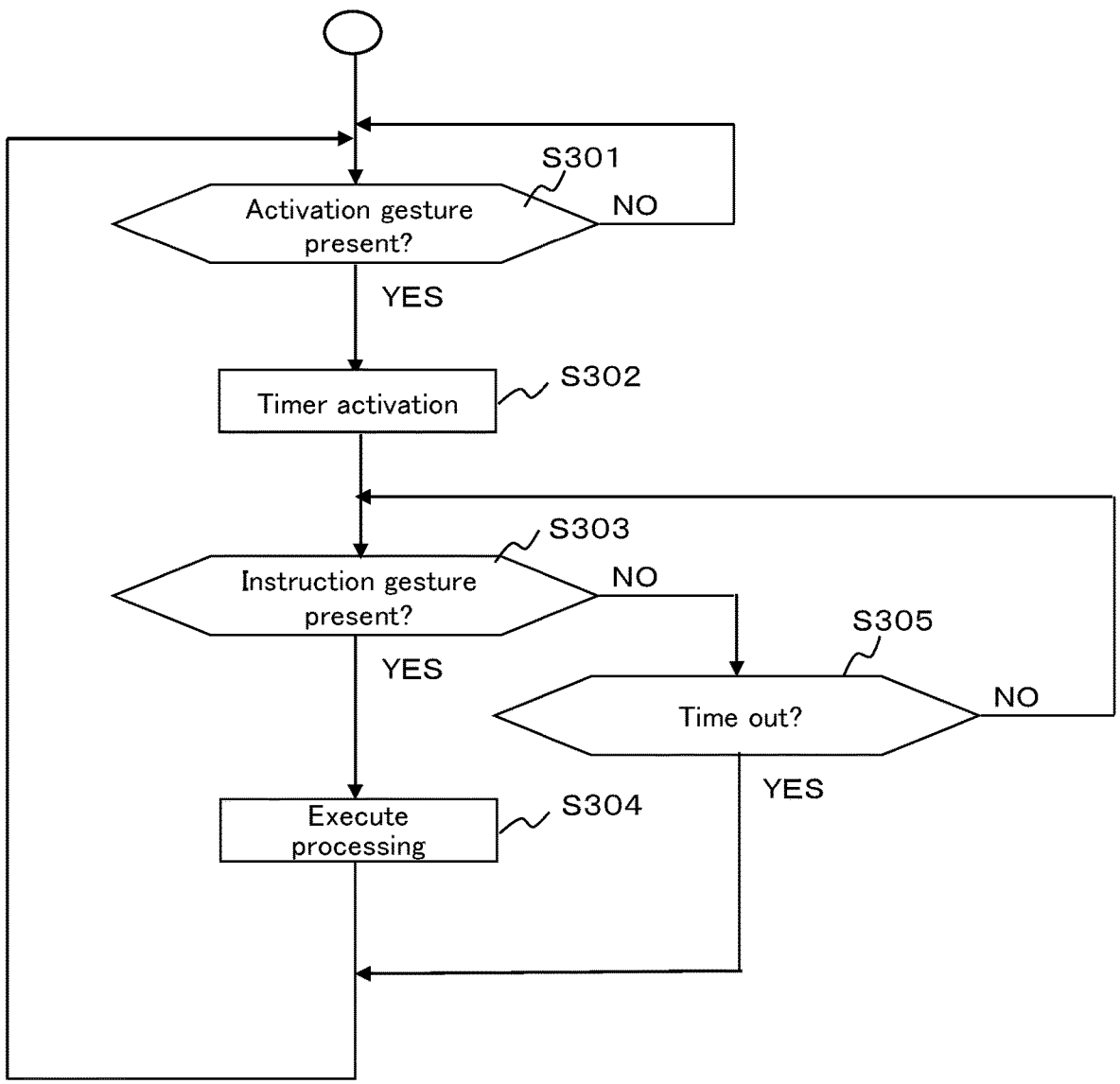
FIG. 8 is a flowchart for illustrating gesture operation processing by the image display system according to the first embodiment.
Figure 9:
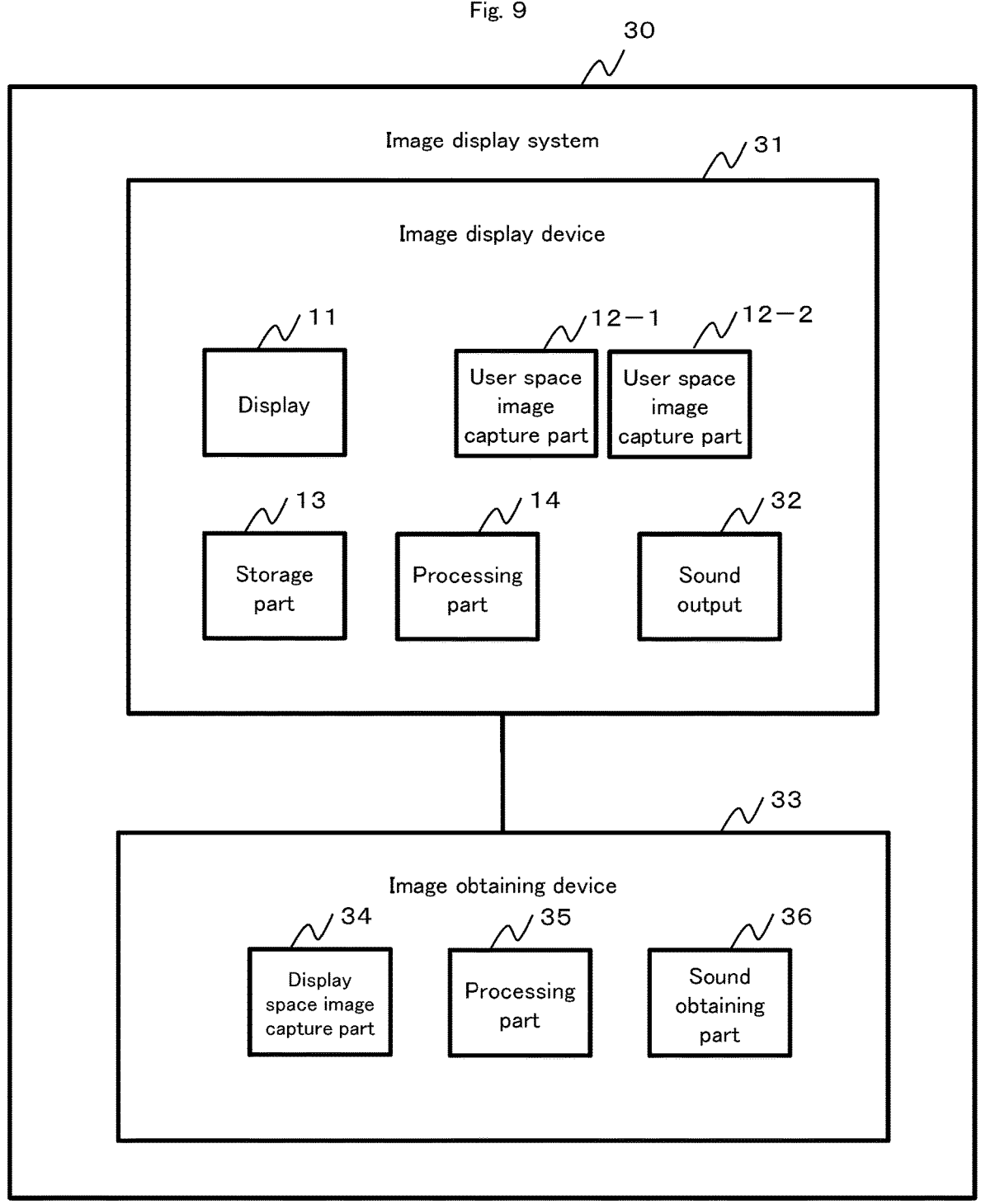
FIG. 9 is a block diagram of an image display system according to a second embodiment of the present invention.

According to the embodiment, the user 90 can operate the image display system 10 by gestures. FIG. 8 is a flowchart for illustrating gesture operation processing in the image display system according to the first embodiment.

The processing part 14 monitors for a prescribed activation gesture on the basis of a user space image updated time series (step S301). The activation gesture is a preliminary gesture for providing an instruction to the image display system 10. Specific gestures, though not particularly limited, may be for example touching the head. While no activation gesture is detected, the image display system 10 does not execute prescribed processing even if an instruction gesture is performed to instruct the processing.

Upon detecting the activation gesture, the processing part 14 activates a timer (step S302). The timer measures time required for validating the instruction gesture in response to the activation gesture. Upon detecting the activation gesture, the processing part 14 may provide a prescribed instruction reception display on the screen 111 of the display 11 to indicate to the user 90 that the activation gesture has been detected. The processing part 14 may continuously display the instruction reception display on the display 11 until the activation gesture is detected or the timer times out.

Then, the processing part 14 monitors for an instruction gesture on the basis of a user space image updated time series (step S303). The instruction gesture is a gesture for instructing prescribed processing as described above. There may be more than one kind of processing which can be instructed by a gesture. In this case, a different instruction gesture may be determined for each kind of processing.

While an instruction gesture is not detected (NO in step S303), the processing part 14 monitors for the presence or absence of a timer timeout (step S305) and monitors for the instruction gesture until the timer times out.

Upon detecting the time out of the timer before the instruction gesture is detected (YES in step S305), the processing part 14 returns to the step S301 and monitors for the activation gesture.

Upon detecting an instruction gesture before the timer times out (YES in step S303), the processing part 14 executes processing corresponding to the instruction gesture (step S304).

As described above, when the processing part 14 detects a prescribed activation gesture from time-series user space images and then detects a prescribed instruction gesture, the processing part 14 performs prescribed processing corresponding to the instruction gesture. Since processing is performed when there are gestures in the two steps, processing unintended by the user 90 can be prevented from being performed by mistake.

Although not limited thereto, the two-step gesture is used according to the embodiment. As another example, the image display system 10 may be operated by a one-step gesture. Also, in this case, erroneous operation can be suppressed by using a gesture which is rarely performed in normal operation. Also, when a prescribed instruction gesture is detected after two or more preliminary gestures are detected, processing corresponding to that instruction gesture may be performed.

Also in the description of the embodiment, the image display system 10 has one display 11 by way of illustration though not limited. As another example, the image display system 10 may include multiple displays 11. In this case, for example, the storage part 13 holds screen positioning data indicating the position, orientation, and shape of each of the screens 111 of the plurality of displays 11 in the reference coordinate space. The processing part 14 generates a display image of a three-dimensional object on the basis of the screen positioning data (screen position data 21 and screen orientation data 22) of the display 11 and the three-dimensional data 25 for each of the plurality of displays 11, and has each display image displayed on the screen 111 of the display 11. Since the positions and orientations of the screen 111 of all the displays 11 are arranged in the same reference coordinate space for calculation, the images displayed on all the displays 11 can be calculated by a common calculation method regardless of the positions and orientations of the plurality of displays 11. Since the positions and orientations of the screens 111 of all the displays 11 are arranged in the same reference coordinate space for calculation, the images on the multiple displays 11 can be aligned with high accuracy to be continuous. This provides a high visual effect in improving indoor scenes for example in hotels, houses, and offices.

The image display system 10 according to the embodiment may also include various additional functions.

For example, the image display system 10 may include a communication device which is connected to a communication network such as the Internet. The image display system 10 may transmit information to a web server via the communication device or may receive information from a web server. The operation of transmitting or receiving information may be performed by the gestures described above.

The image display system 10 may also be connected to a personal computer and may be used as a monitor for displaying an image for a personal computer (PC). The connection interface part is for example an HDMI (High-Definition Multimedia Interface) (HDMI is a registered trademark) or a VGA (Video Graphics Array). Operation such as mode switching between the pseudo window and the PC monitor may be performed by the gestures described above.

Second Embodiment

According to the first embodiment, the image display system 10 displays an image of a virtual three-dimensional object by way of illustration though not limited thereto. As another example, an image of a real space may be displayed on the display 11. According to a second embodiment of the invention, an exemplary image display system displays an image of a real space.

FIG. 10 is a block diagram of the image display system according to the second embodiment. Referring to FIG. 10, the image display system 30 includes an image display device 31 and an image obtaining device 33. The image display device 31 and the image obtaining device 33 are connected through a communication line. For example, the image display device 31 may display three-dimensional data based on an actually shot image obtained by the image obtaining device 33 through the communication network. The image display device 31 and the image obtaining device 33 may also be connected by wired or wireless communication, and the image display device 31 may display in real time an image based on an image obtained by the image obtaining device 33.

The image display device 31 is the same as the image display system 10 according to the first embodiment and includes a display 11, two user space image capture parts 12-1 and 12-2, a storage part 13, and a processing part 14. The image obtaining device 33 includes a display space image capture part 34, a processing part 35, and a sound obtaining part 36.

The display space image capture part 34 obtains an image of a display space as a real space to be displayed on the display 11.

The sound obtaining part 36 obtains a sound in the display space.

The processing part 35 produces the three-dimensional data 25 using the image data obtained by the display space image capture part 34. The processing part 35 transmits the produced three-dimensional data and the sound data obtained by the sound obtaining part 36 to the image display device 31.

The method of how the processing part 35 produces the three-dimensional data 25 from an actually shot image obtained by the display space image capture part 34 is not particularly limited. For example, an obtained shot image of a plane may be arranged on a three-dimensional space as a plane as is or after being divided into a plurality of images with a prescribed size. For example, using a camera with a wide viewing angle lens having a viewing field of 180° or close to it or a 360° camera as the display space image capture part 34, an image captured by the display space image capture part 34 may be arranged on a three-dimensional space as the image is attached on the inner surface of a spherical object on the three-dimensional space. A camera using light-field technology as the display space image capture part 34 obtains information on the incoming direction and intensity of light, and data resulting from photographing a three-dimensional space itself including depth information is obtained by image processing using the information. The data may be arranged on a three-dimensional space. The actually captured image may be made into three-dimensional data and arranged in a three-dimensional space. Images having depth information may be captured using multiple stereo cameras, and three-dimensional data may be produced on the basis of the actually captured images and the depth information. In this case, the display space image capture part 34 is an assembly of a plurality of single unit image capture parts and obtains images of a display space captured in a plurality of directions.

As described above, according to the embodiment, the image obtaining device 33 obtains an image by image-capturing a display space as a real space to be displayed using the display space image capture part 34. The processing part 35 produces three-dimensional data using the image data obtained by the display space image capture part 34. Then, using the three-dimensional data, the image display device 31 displays, on the display 11, an image of a three-dimensional space represented by the three-dimensional data and viewed through the screen 111 from the position of the user 90. Therefore, an image in real space can be displayed on the display 11 as an image visible from the user viewpoint position.

According to the embodiment, the sound obtaining part 36 obtains a sound in the display space. Then, the sound output part 32 outputs the sound to the user space. Therefore, not only images of the display space but also sounds can be reproduced, the user 90 can experience a real space visually and audibly beyond the pseudo window by the display 11.

Although applications of the screen display system 30 according to the embodiment are not particularly limited, the image obtaining device 33 may be arranged for example in a stadium, so that a field of view from a seat for watching an actual sports game is reproduced in a pseudo manner using the image display device 31, or the image display system 30 may be connected through a communication network to transmit/receive images and sounds obtained by the image obtaining device 33, so that real-time communication based on the images and sounds is performed between remote areas.

The embodiments described above are illustrative for the purpose of describing the present invention and are not intended to limit the scope of the present invention. A person skilled in the art can carry out the present invention in various other manners without departing from the scope of the present invention.

REFERENCE SIGNS LIST

10 Image display system
11 Display
12 User space image capture part
13 Storage part
14 Processing part
21 Screen position data
22 Screen orientation data
23 Screen shape data
24 Image capture position data
25 Image capture orientation data
26 Three-dimensional data
27 User viewpoint position data
28 Display image data
30 Image display system
31 Image display device
32 Sound output part
33 Image obtaining device
34 Display space image capture part
35 Processing part
36 Sound obtaining part
90 User
111 Screen

The invention claimed is:

1. An image display system comprising:
a display having a screen configured to display an image;
a camera configured to capture a user space image of a user space that is forward of the screen;
a memory configured to store (i) screen positioning data indicating a position, orientation, and shape of the screen in a prescribed reference coordinate space, (ii) camera positioning data indicating a position and orientation of the camera in the reference coordinate space, and (iii) three-dimensional data representing a three-dimensional object on the reference coordinate space; and a processor configured to:
  identify a user viewpoint position on the reference coordinate space based on the camera positioning data and the user space image captured by the camera,
  generate, based on the user viewpoint position, the screen positioning data, and the three-dimensional data, a display image of the three-dimensional object that is viewable in a virtual space from the user viewpoint position via the screen, and
  cause the display image to be displayed on the screen of the display.

2. The image display system according to claim 1, wherein the processor generates the display image of the three-dimensional object visible from the user viewpoint position via the screen by applying projective transformation to the three-dimensional data.

3. The image display system according to claim 1, wherein the camera is configured to image-capture the user space at an angle of field of at least 110°.

4. The image display system according to claim 1, wherein the processor is configured to generate the display image of the three-dimensional object visible from the user viewpoint position via the screen by projecting, on the reference coordinate space, points in the three-dimensional data on points where lines, which connect the points and the user view point position, cross the screen.

5. The image display system according to claim 1, further comprising a plurality of the displays, wherein:
  the memory is configured to store screen positioning data indicating the position, the orientation, and the shape of the screen of each of the plurality of displays on the reference coordinate space, and
  the processor is configured to generate, for each of the plurality of displays and based on the display screen positioning data and the three-dimensional data, the display image of the three-dimensional object, and cause the display image to be displayed on the screen of the plurality of displays.

6. The image display system according to claim 1, wherein
  the camera has at least two image capture parts, and
  the processor is configured to:
  record at least one of data on the image captured by the camera and information about the user viewpoint position calculated from the image,
  calculate, when a plurality of images captured by the at least two image capture parts have a prescribed body part of the user relating to the user viewpoint position, the user viewpoint position being based on a parallax among the plurality of images, and
  when the the body part of the user is included in only one image captured by the camera, determine the user viewpoint position based on the one image and data on images in the past or user viewpoint positions in the past.

7. The image display system according to claim 1, wherein the processor is configured to:
  store, in the memory, at least one of data on the image obtained by the camera and the user viewpoint position calculated from the image, and
  remove noise included in the user viewpoint position based on at least one of time-series user viewpoint positions and time-series images captured by the camera, which are recorded in the memory.

8. The image display system according to claim 1, wherein the processor is configured to:
  store, in the memory, the user viewpoint position, and
  when a current user viewpoint position cannot be identified from the user space image captured by the camera, estimate the current user viewpoint position based on time-series user viewpoint positions recorded in the memory.

9. The image display system according to claim 1, wherein the processor is configured to detect a prescribed gesture of the user from time-series user space images and perform prescribed processing corresponding to the gesture.

10. The image display system according to claim 9, wherein the processor is configured to:
  upon detecting a prescribed instruction gesture after detecting an activation gesture from the time-series user space images, execute prescribed processing corresponding to the instruction gesture, and
  upon detecting the instruction gesture without detecting the activation gesture, not execute the processing.

11. The image display system according to claim 1, further comprising a display space camera configured to capture a display space, which is a real space to be displayed, to obtain a three-dimensional image, wherein
  the processor is configured to generate the three-dimensional data using data on the image obtained by the display space camera.

12. The image display system according to claim 11, further comprising:
  a microphone configured to obtain a sound in the display space; and
  a speaker configured to output the sound to the user space.

* * * * *